(12) United States Patent
Brousseau et al.

(10) Patent No.: US 12,036,829 B2
(45) Date of Patent: Jul. 16, 2024

(54) ASSEMBLY FOR A TIRE, TIRE AND ASSOCIATED MANUFACTURING METHODS

(71) Applicant: COMPAGNIE GENERALE DES ETABLISSEMENTS MICHELIN, Clermont-Ferrand (FR)

(72) Inventors: Magaly Brousseau, Clermont-Ferrand (FR); Bastien Limozin, Clermont-Ferrand (FR); Sebastien Rigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 271 days.

(21) Appl. No.: 17/417,985

(22) PCT Filed: Dec. 24, 2019

(86) PCT No.: PCT/FR2019/053296
§ 371 (c)(1),
(2) Date: Jun. 24, 2021

(87) PCT Pub. No.: WO2020/136354
PCT Pub. Date: Jul. 2, 2020

(65) Prior Publication Data
US 2022/0072905 A1 Mar. 10, 2022

(30) Foreign Application Priority Data
Dec. 24, 2018 (FR) ........................ 1874106

(51) Int. Cl.
*B60C 3/02* (2006.01)
*B60C 7/00* (2006.01)
*B60C 7/10* (2006.01)
*B60C 7/14* (2006.01)
(Continued)

(52) U.S. Cl.
CPC .................. *B60C 3/02* (2013.01); *B60C 7/00* (2013.01); *B60C 7/10* (2013.01); *B60C 7/107* (2021.08);
(Continued)

(58) Field of Classification Search
CPC .. B60C 9/005; B60C 9/02; B60C 9/18; B60C 3/02; B60C 7/00; B60C 7/10; B60C 7/107; B60C 7/146
(Continued)

(56) References Cited

U.S. PATENT DOCUMENTS 2,884,044 A * 4/1959 Hulswit, Jr. .............. B60C 9/22
156/123
3,756,883 A * 9/1973 Gay ........................ B29D 30/22
156/123
(Continued)

FOREIGN PATENT DOCUMENTS

EP 3231637 A1 10/2017
FR 3038543 A1 * 1/2017 ............. B60C 7/125
(Continued)

OTHER PUBLICATIONS

International Search Report dated Apr. 29, 2020, in corresponding PCT/FR2019/053296 (4 pages).

*Primary Examiner* — Sedef E Paquette
(74) *Attorney, Agent, or Firm* — VENABLE LLP (57) ABSTRACT

An assembly (1) for a tire comprises a first structure (10), a second structure (12) and bearing cord elements. The assembly comprises a gimped securing element (18) comprising a core (18a) around which a gimp yarn (18b) is wound. The core (18a) exhibits an elongation at rupture $A_{rupture\_core}$ and the gimp yarn (18b) exhibits an elongation at rupture $A_{rupture\_gimp}$ such that: $A_{rupture\_core} < A_1 = h/(E+e_1+e_2)$ and $A_{rupture\_gimp} > A_1 = h/(E+e_1+e_2)$ in which h is the conforma-
(Continued)

tion height of the assembly, $e_1$ is the thickness of the first structure (10), $e_2$ is the thickness of the second structure (12), and E is the lock length.

15 Claims, 4 Drawing Sheets (51) Int. Cl.
    *B60C 9/00*           (2006.01)
    *B60C 9/02*           (2006.01)
    *B60C 9/18*           (2006.01)

(52) U.S. Cl.
    CPC .............. *B60C 7/146* (2021.08); *B60C 9/005* (2013.01); *B60C 9/02* (2013.01); *B60C 9/18* (2013.01)

(58) Field of Classification Search
    USPC ........................................................ 152/151
    See application file for complete search history.

(56) References Cited

U.S. PATENT DOCUMENTS

| | | |
|---|---|---|
| 10,682,887 B2 | 6/2020 | Sportelli et al. |
| 11,046,112 B2 | 6/2021 | Rigo et al. |
| 11,148,379 B2 | 10/2021 | Rigo et al. |
| 11,325,418 B2 | 5/2022 | Rigo et al. |
| 11,331,953 B2 | 5/2022 | Rigo et al. |
| 11,518,158 B2 | 12/2022 | Cornille et al. |
| 2014/0373502 A1* | 12/2014 | Cour ...................... D02G 3/328 57/225 |
| 2017/0297373 A1 | 10/2017 | Sportelli et al. |
| 2018/0194169 A1* | 7/2018 | Vilcot ...................... B60C 9/02 |
| 2018/0291535 A1* | 10/2018 | Ridley ................... D02G 3/406 |
| 2018/0361790 A1 | 12/2018 | Rigo et al. |
| 2018/0361791 A1 | 12/2018 | Rigo et al. |
| 2019/0358921 A1 | 11/2019 | Rigo et al. |
| 2019/0366772 A1 | 12/2019 | Rigo et al. |
| 2020/0254819 A1 | 8/2020 | Cornille et al. |
| 2022/0080775 A1 | 3/2022 | Limozin et al. |
| 2022/0410625 A1 | 12/2022 | Guillaumain et al. |

FOREIGN PATENT DOCUMENTS

| | | | |
|---|---|---|---|
| FR | 3045462 A1 * | 6/2017 | ............... B60C 3/02 |
| FR | 3061673 A1 | 7/2018 | |
| FR | 3061674 A1 | 7/2018 | |
| FR | 3061675 A1 | 7/2018 | |
| WO | 2017/103490 A1 | 6/2017 | |
| WO | 2017/103491 A1 | 6/2017 | |

* cited by examiner

ASSEMBLY FOR A TIRE, TIRE AND ASSOCIATED MANUFACTURING METHODS

FIELD OF THE INVENTION

The invention relates generally to the field of tyres for a vehicle, typically a passenger, two-wheeled, heavy goods, agricultural, civil engineering vehicle or an aeroplane, or, more generally, for any rolling device. More specifically, the invention relates to the flattening of such a tyre.

TECHNOLOGICAL BACKGROUND

A tyre 4 is a toroidal structure intended to be mounted on a rim, pressurized by an inflation gas and crushed on a ground under the action of a load.

Figure 1:
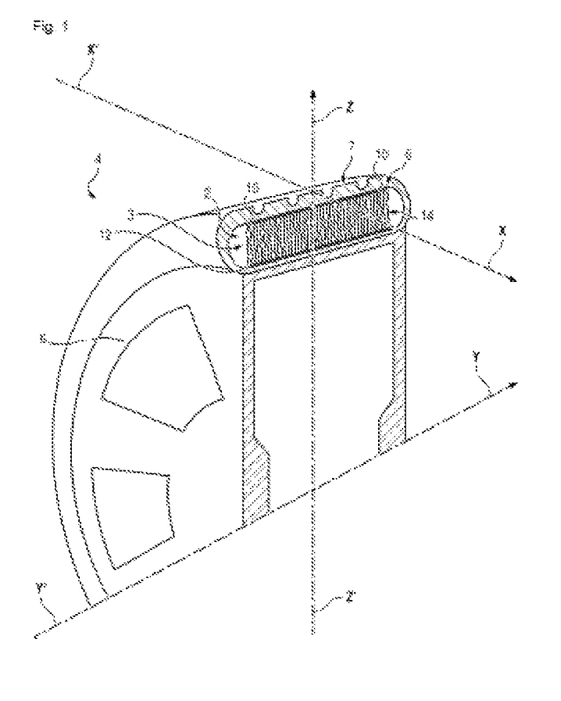
FIG. 1 is a perspective and partial cross-sectional view of an example of production of a tyre according to an embodiment of the invention represented in the absence of applied load and pressure.

As can be seen in FIG. 1 which illustrates an example of a tyre 4, a tyre 4 has a rolling surface (that is to say, a surface intended to enter into contact with a ground), a rolling plane (that is to say a plane normal to the axis of rotation Y-Y' and which intersects the rolling surface), a circumferential axis X-X' (which corresponds to an axis of the rolling plane which is tangential to the rolling surface) and a radial axis Z-Z' (which corresponds to an axis transversal to the axis of revolution Y-Y' of the tyre 4 and which intersects the axis of revolution Y-Y').

As is known per se, the tyre 4 comprises, from the axis of revolution Y-Y' to its rolling surface, a carcass 3, a crown arranged radially outside the carcass 3 and a tread 7.

The carcass 3 is a structure of revolution comprising a carcass ply comprising carcass reinforcing elements. The carcass reinforcing elements are substantially parallel to one another in a given direction and form an angle greater than or equal to 65°, preferably greater than or equal to 80° and, here, more preferentially substantially equal to 90°, with the circumferential axis X-X' of tyre 4. The carcass reinforcing elements can notably comprise fabric filamentary reinforcing elements, for example comprising two strands of 144 tex polyester wound together with 290 turns.

The crown 6 is a structure of revolution arranged radially outside the carcass 3 and comprises two working plies and one hooping ply.

Each working ply comprises working reinforcing elements. Working reinforcing elements are substantially parallel to one another in a direction and form an angle ranging from 15° to 40°, preferably ranging from 20° to 30° with a circumferential axis of the tyre 4 and, here, equal to 26°. The working reinforcing elements are crossed from one working ply to another. They can notably comprise metallic cord reinforcing elements, for example cables of 2×0.30 mm structure.

The hooping ply is arranged radially outside the working plies and comprises bracing cord reinforcing elements substantially parallel to one another forming an angle at most equal to 10°, preferably ranging from 5° to 10° with the circumferential direction of the tyre 4 and, here, equal to 5°. The bracing reinforcing elements can comprise textile cord reinforcing elements, for example comprising two 167 tex aramid strands wound together with 315 turns.

The tread 7 is arranged radially outside the crown 6 and is intended to enter into contact with a ground. The rolling surface therefore corresponds to all or part of the radially outer face of the tread 7.

The carcass ply, the working plies and the hooping ply are produced in one or more polymer compositions, for example elastomeric compositions comprising at least one elastomer, preferably dienic, for example natural rubber, in which the corresponding reinforcing elements are embedded.

The tread 7 is produced in a polymeric composition, for example an elastomeric composition comprising at least one elastomer, preferably dienic, for example natural rubber.

In order to enhance the flattening of the tyre 4, an assembly has been proposed comprising a first structure formed by first cord elements, a second structure formed by second cord elements and a bearing structure comprising bearing cord elements linking the first structure and the second structure. The first structure and the second structure can be coated or impregnated with an elastomeric composition, typically rubber, for example by calendering.

This assembly can, for example, be formed by a three-dimensional fabric or a three-dimensional weave. Reference can notably be made to the documents WO2017/103490 and WO 2017/103491, in the name of the Applicant, which describe examples of assemblies and their manufacturing methods.

Such an assembly makes it possible to significantly enhance the flattening of the tread 7 when the tyre 4 is subjected to a load.

However, the Applicant noticed that the flattening of the tread 7 was further enhanced when the top structure and the bottom structure of the assembly were perfectly aligned in the tyre 4. Now, it is commonplace, during the handling of the assembly, for one of the structures to slip with respect to the other, the bearing structure not then being taut and therefore not being able to prevent the relative movement thereof.

In order to prevent this relative slip, the document WO2017/103490 teaches the use of sacrificial means to fix the top structure on the bottom structure in the handling of the assembly. In particular, the sacrificial means make it possible to guarantee the correct positioning of the two structures until they are placed on the building drum. For that, the sacrificial means are dimensioned so as to break when the top structure and the bottom structure are separated from one another, for example at the time of the shaping of the tyre. However, the Applicant noticed that it could be difficult to correctly dimension the sacrificial means in order to guarantee both the positional securing of the top and bottom structures during handling and the breaking thereof at the time of shaping. Now, when the sacrificial means do not break during the shaping, that causes the production of the assembly to be slowed down. On the other hand, when all or part of the sacrificial means break during the handling of the assembly, and therefore before the shaping, the first structure and the second structure become misaligned, thus damaging the flattening of the tread 7. Since the breaking of the sacrificial means is also not uniform throughout, it also creates structural non-uniformities which degrade the performance of the tyre. Finally, an additional constraint to be taken into account is that the sacrificial means must be capable of withstanding the bonding temperatures, which can exceed 200° C. It follows therefrom that the use of sacrificial means does not therefore make it possible to guarantee the alignment of the structures, except by dimensioning them accurately with each new assembly, which is costly and difficult to envisage on an industrial scale.

SUMMARY OF THE INVENTION

The objective of the invention is to propose a novel assembly, an associated manufacturing method and an associated tyre which make it possible to overcome the difficulties of alignment of the first structure and the second structure of the assembly simply, efficiently and inexpensively without in any way slowing down the manufacture of the assembly and tyre, and which makes it possible to guarantee that a tyre is obtained in which the flattening of the tread is significantly enhanced.

For that, the invention proposes an assembly for a tyre comprising:
- a first structure formed by first cord elements, the first structure having a longitudinal edge extending in a first direction which defines a first axis,
- a second structure formed by second cord elements, the second structure comprising a longitudinal edge extending in a second direction which defines a second axis, the first axis and the second axis being parallel,
- a bearing structure comprising bearing cord elements linking the first cord elements of the first structure and the second cord elements of the second structure, and
- at least one cord securing element fixed to the first cord elements and to the second cord elements, the assembly being characterized in that the at least one securing element comprises a gimped cord element comprising a core around which a gimp yarn is wound, wherein:
- the core of the securing element exhibits an elongation at rupture lower than the ratio $A_1$ between a conformation height of the assembly and the sum of a thickness of the first structure, of a thickness of the second structure and of a lock length:

$$A_{rupture\_core} < A_1 = h/(E+e_1+e_2)$$

in which: $A_{rupture\_core}$ is the elongation at rupture of the core h is the conformation height of the assembly, corresponding to a height between opposite faces of the first structure and the second structure when the bearing cord elements are taut $e_1$ is the thickness of the first structure $e_2$ is the thickness of the second structure E is the lock length, and the gimp yarn of the securing element exhibits an elongation at rupture greater than an elongation equal to said ratio $A_1$ between the conformation height of the assembly and the sum of the thickness of the first structure, of the thickness of the second structure and of the lock length:

$$A_{rupture\_gimp} > A_1 = h/(E+e_1+e_2)$$

wherein: $A_{rupture\_gimp}$ is the elongation at rupture of the core.

Certain preferred but nonlimiting features of assembly described above are as follows, taken individually or in combination:
- the securing element exhibits a first secant rigidity and the core exhibits a first elongation at rupture, the gimp yarn exhibits a second secant rigidity and a second elongation at rupture, the first secant rigidity of the securing element being strictly greater than the second secant rigidity of the gimp yarn, the first elongation at rupture of the core being strictly less than the second elongation at rupture of the gimp yarn.
- the at least one securing element has two opposite free ends and is anchored to the first cord elements and to the second cord elements at its free ends and is locked in the first structure and in the second structure between its free ends.
- the at least one securing element has two opposite free ends and is anchored to the first cord elements and to the second cord elements at its free ends and at several points between its free ends, and the elongation at rupture of the core $A_{rupture\_core}$ is lower than the ratio $A_2$ between a conformation height of the assembly and the sum of the thickness of the first structure, and of the thickness of the second structure $A_{rupture\_core} < A_2 = h/(e_1+e_2)$, the elongation at rupture of the gimp yarn $A_{rupture\_gimp}$ being greater than the ratio $A_2$ between a conformation height of the assembly and the sum of the thickness of the first structure, and of the thickness of the second structure: $A_{rupture\_gimp} > A_2 = h/(e_1+e_2)$.

A secant rigidity of the gimp yarn of the securing element is less than or equal to a maximum rigidity which corresponds to the ratio between a force undergone by the gimp yarn of the securing element upon the application of a predetermined shaping pressure so as to form a space separating the first structure and the second structure from one another, and its elongation at this shaping pressure: $E_{max} = F_{gimp}/A$, in which: $F_{gimp}$ corresponds to the force undergone by the gimp yarn of the at least one securing element at the predetermined shaping pressure, A corresponds to the elongation of the securing element at this shaping pressure.

A secant rigidity of the securing element is greater than or equal to a minimum rigidity which corresponds to the ratio of a force undergone by the securing element under a predetermined winding tension and of the elongation that the securing element should be capable of undergoing under this same winding tension: $E_{min} = F_{T\_reinforcement}/A_T$, in which: $F_{T\_reinforcement}$ corresponds to the force undergone by the securing element under the winding tension T, $A_T$ corresponds to the elongation that the securing element should be capable of undergoing under this same winding tension.

According to a second aspect, the invention proposes a method for manufacturing an assembly as described above, said manufacturing method comprising the following steps:
- placing the first structure on the second structure so that the first axis and the second axis are substantially parallel, and
- fixing the first structure onto the second structure by fixing at least one securing element to the first cord elements and to the second cord elements, the manufacturing method being characterized in that the at least one securing element comprises at least one gimped cord element comprising a core around which a gimp yarn is wound, and wherein:
- the core of the securing element exhibits an elongation at rupture less than the ratio $A_1$ between a conformation height of the assembly and the sum of a thickness of the first structure, of a thickness of the second structure and of a lock length:

$$A_{rupture\_core} < A_1 = h/(E+e_1+e_2)$$

in which: $A_{rupture\_core}$ is the elongation at rupture of the core h is the conformation height of the assembly, corresponding to a height between opposite faces of the first structure and of the second structure when the bearing cord elements are taut $e_1$ is the thickness of the first structure $e_2$ is the thickness of the second structure E is the lock length, and the gimp yarn of the securing element exhibits an elongation at rupture greater than an elongation equal to said ratio $A_1$ between the conformation height of the assembly and the sum of the thickness of the first structure, of the thickness of the second structure and of the lock length:

$$A_{rupture\_gimp} > A_1 = h/(E+e_1+e_2)$$

in which: $A_{rupture\_gimp}$ is the elongation at rupture of the core.

Certain preferred but nonlimiting features of the manufacturing method described above are as follows, taken individually or in combination:

the securing element exhibits a first secant rigidity and the core exhibits a first elongation at rupture, the gimp yarn exhibits a second secant rigidity and a second elongation at rupture, the first secant rigidity of the securing element being strictly greater than the second secant rigidity of the gimp yarn, the first elongation at rupture of the core being strictly less than the second elongation at rupture of the gimp yarn.

the at least one securing element has two opposite free ends, the fixing step comprising the substeps of anchoring said at least one securing element to the first cord elements and to the second cord elements at its free ends and of locking said securing element in the first structure and in the second structure between its free ends.

the at least one securing element has two opposite free ends, the fixing step being performed by anchoring said at least one securing element to the first cord elements and to the second cord elements at its free ends and at several points between its free ends, the securing element being dimensioned so that the elongation at rupture of the core $A_{rupture\_core}$ is less than the ratio $A_2$ between a conformation height of the assembly and the sum of the thickness of the first structure, and of the thickness of the second structure: $A_{rupture\_core} < A_2 = h/(e_1+e_2)$, the elongation at rupture of the gimp yarn $A_{rupture\_gimp}$ being greater than the ratio $A_2$ between a conformation height of the assembly and the sum of the thickness of the first structure, and of the thickness of the second structure: $A_{rupture\_gimp} > A_2 = h/(e_1+e_2)$.

the first structure and the second structure are configured to be separated by application of a predetermined shaping pressure so as to form a space separating the first structure and the second structure from one another, and the gimp yarn of the at least one securing element is dimensioned such that a secant rigidity of said gimp yarn is less than or equal to a maximum rigidity which corresponds to the ratio between a force undergone by the gimp yarn of the securing element upon the application of the predetermined shaping pressure to form the space and its elongation at rupture: $E_{max} = F_{gimp}/A$, in which: $F_{gimp}$ corresponds to the force undergone by the gimp yarn of the securing element at the predetermined shaping pressure, A corresponds to the elongation of the securing element at this shaping pressure.

the method further comprises a step of winding the assembly around a drum by applying a predetermined winding tension to said assembly, and in which a secant rigidity of the at least one securing element is greater than or equal to a minimum rigidity which corresponds to the ratio of a force undergone by the securing element under the predetermined winding tension and of the elongation undergone by the securing element under this winding tension: $E_{min} = F_{T\_reinforcement}/A_T$, in which $F_{T\_reinforcement}$ corresponds to the force undergone by the securing element under the winding tension T, $A_T$ corresponds to the elongation undergone by the securing element under this winding tension.

the method further comprises, prior to the fixing step, a step during which the first axis and the second axis are superposed.

According to a third aspect, the invention proposes a method for manufacturing a tyre having an axis of revolution, said method comprising the following steps:
supplying an assembly as described above,
applying a shaping pressure so as to
form an annular space delimited radially by an inner face of the first structure and by an inner face of the second structure, and
breaking the core of the securing element without breaking the gimp yarn of the securing element.

According to a fourth aspect, the invention proposes a tyre having an axis of revolution and comprising:
an assembly as described above, and
an annular space delimited radially by an inner face of the first structure and by an inner face of the second structure,
the tyre being characterized in that it is obtained by a method as described above so that the core of the securing element is broken but not the gimp yarn of said securing element.

BRIEF DESCRIPTION OF THE DRAWINGS

Other features, aims and advantages of the present invention will become more apparent on reading the following detailed description, and in light of the attached drawings given as nonlimiting examples and in which.

DETAILED DESCRIPTION OF AN EMBODIMENT

Assembly 1

The assembly 1 comprises:
a first structure 10 formed by first cord elements 15,
a second structure 12 formed by second cord elements 16, and
a bearing structure 14 comprising bearing cord elements 17 linking the first structure 10 and the second structure 12.

Examples of assemblies 1 comprising these three structures 10, 12, 14 and that can be used, have, for example, been described in detail in the documents WO2017/103490 and WO 2017/103491 described above.

More specifically, the first structure 10 is overall trapezoidal (for example parallelepipedal or rectangular) and has a first longitudinal edge extending along a first direction which defines a first axis 11, a second longitudinal edge opposite the first longitudinal edge and two opposite transverse edges extending transversely to the first and second longitudinal edges.

Likewise, the second structure 12 is overall trapezoidal (for example parallelepipedal or rectangular) and has a first longitudinal edge extending along a second direction which defines a second axis 13, a second longitudinal edge opposite the first longitudinal edge and two opposite transverse edges, extending transversely to the first and second longitudinal edges.

In one embodiment, the first structure and the second structure 10, 12 can comprise a fabric formed by a weaving of warp wires (the first and second cord elements 15, 16) and of weft wires. The assembly 1 is then a three-dimensional fabric.

In a variant, the first structure and the second structure 10, 12 can comprise a knit, in which case the assembly 1 is a three-dimensional knit.

Whatever the production variant, the reinforcement of the fabric of the first structure and/or of the second structure 10, 12 can be of plain weave, twill weave, knitted fabric or satin type. In the case of an assembly 1 for a tyre 4, a reinforcement of plain weave type notably allows good mechanical performance levels to be achieved.

According to yet another variant, one out of the first structure and of the second structure 10, 12 comprises a woven fabric, the other out of the first structure and the second structure 10, 12 being able to comprise a knitted fabric.

Typically, the assembly 1 can comprise a three-dimensional woven or knitted fabric of single walled or double-walled plain weave type, such as, for example, the double-walled fabric PF-Farbroller-GR3-7103_01 marketed by the company PILE FABRICS GmbH and/or the knitted fabric N-02570-A01 marketed by the company HEATHCOAT FABRICS Limited.

The assembly 1 further comprises at least one cord securing element 18 fixed on the one hand to the first cord elements 15 and on the other hand to the second cord elements 16.

Figure 2:
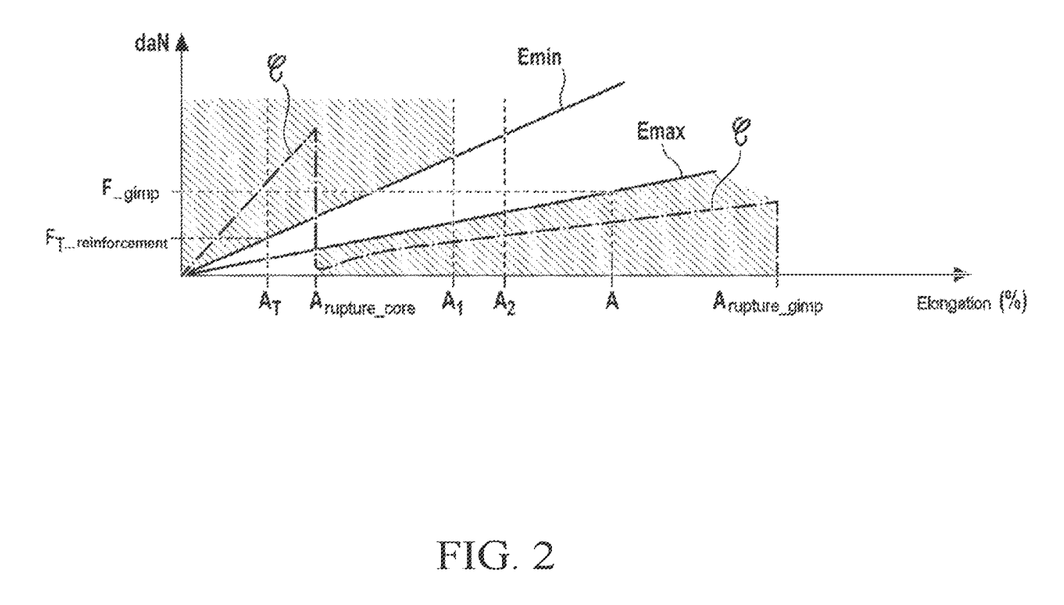
FIG. 2 is a graph illustrating the elongation of a securing element as a function of the force which is applied to it.

The securing element 18 comprises a gimped cord element comprising a first cord member, or core 18a, that is substantially rectilinear, around which is wound a second cord member, or gimp yarn 18b, and exhibits a mechanical behaviour represented by a curve C defining the tensile force applied to the securing element 18 (in daN) as a function of its elongation (in %) as represented, for example, in FIG. 2.

Figure 5:
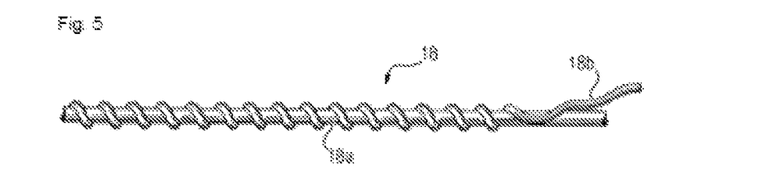
FIG. 5 illustrates an example of production of a securing element that can be used in an assembly, a tyre and associated manufacturing methods according to the invention.

An example of production of a securing element 18 comprising a core 18a and a gimp yarn 18b is illustrated in FIG. 5.

The securing element 18 exhibits, before rupture of the core 18a, a secant rigidity strictly greater than that of the gimp yarn 18b. On the other hand, the gimp yarn 18b exhibits an elongation at rupture $A_{rupture\_gimp}$ strictly greater than the elongation at rupture $A_{rupture\_core}$ of the core 18a.

The secant rigidity of the securing element 18 before rupture of the core 18a, the secant rigidity of the gimp yarn 18b and the elongation at rupture of the core 18a are chosen such that the core 18a is capable of maintaining the first structure 10 in position with respect to the second structure 12 so that the first axis 11 and the second axis 13 are parallel during the handling steps by being slightly deformed, but that it breaks before the deployment of the bearing cord elements 17. Then, upon the rupture of the core 18a on the application of the shaping pressure, the gimp yarn 18b takes over from the core 18a upon the deployment of the bearing cord elements 17 in order to avoid jerks and create structural non-uniformities in the assembly 1 which would risk degrading the performance of the tyre 4.

In other words, the securing element 18 has a significant secant rigidity at low elongations when it undergoes a tensile force of which the value is between zero and the breaking force of the core 18a, then a lower secant rigidity at the greater elongations when it undergoes a tensile force of which the value is greater than the breaking force of the core 18a but lower than the breaking force of the gimp yarn 18b.

The curve C of the securing element 18 is a strictly increasing curve until the rupture of the core, then a decreasing curve, then once again a strictly increasing curve until the rupture of the gimp yarn. Over each increasing part, this curve C is consequently bijective, such that, for each value of the tensile force F applied to a given securing element 18, there is only a single possible elongation value. The person skilled in the art will therefore be able to easily determine the elongation of the securing element 18 from a tensile force value F which is applied to it.

An example of curve C is illustrated in FIG. 2 as a nonlimiting example.

The elongation of the securing element 18 as a function of the value of the tensile force which is applied to it makes it possible to characterize the secant rigidity of the securing element 18 in use, that is to say during the handling of the assembly 1, the shaping of the tyre 4, then once the tyre 4 is inflated to its shaping pressure.

In particular, for any elongation at rupture of the core 18a, the slope of the straight line starting from the origin and being secant at a given point with the curve C corresponding to a given value of the tensile force or to a given value of the elongation, corresponds to the secant modulus of the securing element 18 for this force or this elongation.

Similarly, for any elongation after rupture of the core 18a, the slope of the straight line starting from the point of zero force and of elongation equal to the elongation at rupture of the core 18a and being secant at a given point with the curve C corresponding to a given value of the tensile force or to a given value of the elongation, corresponds to the secant modulus of the gimp yarn 18b for this force or this elongation.

Figure 4A:
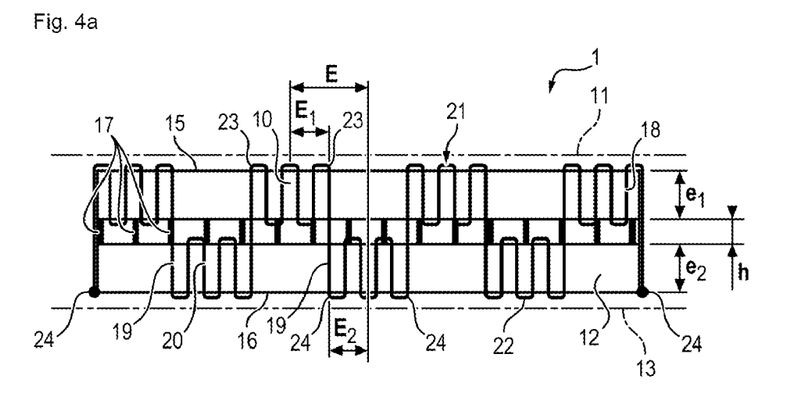
FIG. 4a is a cross-sectional view along a securing element of an example of production of an assembly according to the invention, in which the securing element is locked in the first structure and in the second structure.

The securing element 18 can be fixed to the first structure 10 and to the second structure 12 at its free ends only, for example by tying, bonding or by ultrasound welding (reference 23 and 24 in FIG. 4b), then interlaced with the first cord elements 15 and the second cord elements 16. It will be noted that, in this case, the securing element 18 can be locked around several cords (weft and/or warp) of one of the structures 10, 12, then around several cords (weft and/or warp) of the other of the structures 12, 10, etc., or, as a variant, be interlaced around a first cord element 15 before passing directly around a second cord element 16, and so on. An example of locking is, for example, illustrated in FIG. 4a. In this example, the interlacing is performed according to a regular pitch (three locks before each passage into the next structure).

An irregular or non-periodic pitch can however also be envisaged.

Figure 4B:
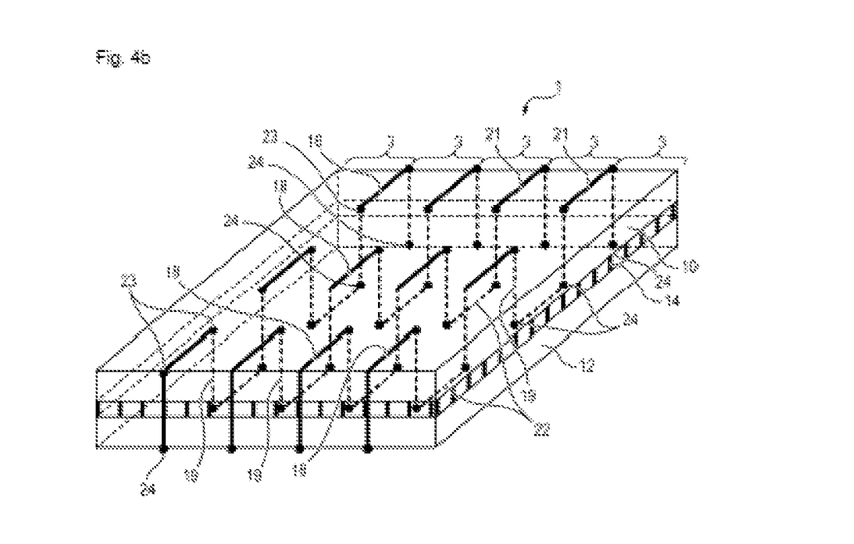
FIG. 4b is a perspective view of an example of production of an assembly according to the invention, in which the securing element is anchored in the first structure and in the second structure.

As a variant, the securing element 18 can be anchored at its free ends but also between its free ends, before each passage into one or other of the structures 10, 12. The anchoring of the securing element 18 can be done by bonding, by tying or by ultrasound welding. For example, the securing element 18 can be anchored in the first structure 10, for example by tying (reference 19a and 24) around a first cord element 15, before its passage into the second structure 12 where it is also anchored by tying around a second cord element, then to return into the first structure 10 where it is tied around another first cord element 15, and so on.

Depending on the chosen fixing mode, it will be understood that the behaviour of the securing element 18, and therefore its dimensioning, differ. Indeed, in the case of a single locking of the securing element 18 with the first cord elements 15 and the second cord elements 16, the securing element 18 is deformed not only in its portion 19 which extends within the space 2 defined between the first structure 10 and the second structure 12, but also in its portion 20 locked within each structure 10, 20. It is therefore all of these portions 19, 20 which have to be taken into account in its dimensioning. It will be noted that the portion 19 is not wound around or fixed to any cord element of the first structure 10 and of the second structure 12 and lies between two successive anchoring points 23 and 24 of the securing element 18 in the first structure 10 and in the second structure 12.

On the other hand, when the securing element 18 is anchored in the first structure 10 and in the second structure 12, only the deformation of the portion 19 extending between two successive anchoring points 23 and 24 of the securing element 18 has to be taken into account for its dimensioning.

Anchoring point 23, 24 of the securing element 18 in the first structure 12 and in the second structure 12, respectively, will be understood here to mean the junction point between each portion 19 of the securing element 18 which extends within the space 2 and each portion 21, 22 of the securing element 18 which extends on either side of a given portion 19, around which a portion of the securing element 18 is wound or at which the securing element 18 is fixed to a cord element of the first structure 10 or of the second structure 12.

In one embodiment, the securing element 18 is dimensioned so as to fulfil the following three conditions:
  (i) to be sufficiently deformable to be elongated sufficiently without breaking and to allow the tensioning of the bearing cord elements 17 of the bearing structure 14,
  (ii) to be sufficiently flexible to not withstand the shaping forces and not prevent the formation of the space 2 by separation of the first structure 10 from the second structure 12 during the shaping,
  (iii) to be sufficiently rigid not to break during the steps of handling of the assembly and thus guarantee the correct positioning of the first structure 10 with respect to the second structure 12.

The purpose of the first constraint (i) is to allow the relative separation of the first structure 10 and of the second structure 12, by elastic elongation of the securing element 18 without rupture. Indeed, as has been seen above, the rupture of the securing element 18 would create structural non-uniformities which degrade the quality of the tread 7.

For that, the securing element 18, and more particularly the gimp yarn 18b (since the core 18a must break before the bearing cord elements 17 are deployed), is chosen so as to be capable of being elongated sufficiently to allow this separation.

As indicated above, the necessary elongation differs according to the method of fixing the securing element 18.

In the case where the securing element 18 is simply locked in the first structure and in the second structure 10, 12, the gimp yarn 18b of the securing element 18 has to be capable of exhibiting an elongation at rupture $A_{rupture\_gimp}$ (in %) greater than the ratio $A_1$ between the conformation height h and the sum of the thickness $e_1$ of the first structure 10, of the thickness $e_2$ of the second structure 12 and of the lock length E:

$$A_{rupture\_gimp} > A_1 = h/(E + e_1 + e_2)$$

in which h corresponds to the distance, in a direction at right angles to a plane normal to the first structure 10 when the latter is placed on a flat surface, between the opposite faces of the first structure 10 and of the second structure 12 when said structures 10, 12 are separated by application of the shaping pressure so that the bearing cord elements 17 are taut. $e_1$ corresponds to the dimension, in this direction at right angles, between the inner face and the outer face of the first structure 10, $e_2$ corresponds to the dimension, in this direction at right angles, between the inner face and the outer face of the second structure 12, E corresponds to the lock length, that is to say the curvilinear length of the locked portion 18b of the securing element 18 locked within the first structure 10 and the second structure 12, on either side of a portion 19 (this curvilinear length not including the curvilinear length of the portion 18a). This lock length E is equal to the sum of the curvilinear length E1 of the part 21 of the portion 20 of the securing element 18 which is locked in the first structure 10 and of a curvilinear length E2 of the part 22 of the portion 20 of the securing element 18 which is locked in the second structure 12, where the curvilinear length E1 is equal to half the curvilinear length of the securing element 18 which is locked between two successive anchoring points 23 in the first structure 10, and the curvilinear length E2 is equal to half the curvilinear length of the securing element 18 which is locked between two successive anchoring points 24 of the securing element 18 in the second structure 12.

In the case where the securing element 18 is anchored in the first structure and in the second structure 10, 12, the gimp yarn 18b of the securing element 18 must be capable of exhibiting an elongation at rupture $A_{rupture\_gimp}$ (in %) greater than the ratio $A_2$ between the conformation height h and the sum of the thickness $e_1$ of the first structure 10 and of the thickness $e_2$ of the second structure 12:

$$A_{rupture\_gimp} > A_2 = h/(e_1 + e_2).$$

In fact, the portions 21 and 22 of the securing element 18 which are within the first structure 10 and the second structure 12 are elongated independently of the portion 19 which links them, since they are isolated from the portion 19 by the anchoring points 23 and 24.

The second constraint (ii) is to not be too rigid to not withstand the shaping stresses and prevent the separation of the first structure 10 from the second structure 12 during the shaping. The deployment of the assembly 1 should in fact be able to be done under a predetermined shaping pressure, dependent on the tyre 4 that is wanted to be produced: the securing element 18 should therefore not prevent the separation of the structures 10, 12 upon the application of this shaping pressure. Consequently, the second rigidity of the gimp yarn 18b of the securing element 18 (the core 18a breaking upon the application of the shaping pressure) must be less than or equal to the maximum admissible rigidity $E_{max}$, which corresponds to the ratio between the force $F_{reinforcement}$ undergone by the gimp yarn 18b at the shaping pressure and its elongation A when the space 2 is formed by the application of this shaping pressure:

$$E_{max} = F_{gimp}/A$$

in which $F_{gimp}$ corresponds to the force undergone by the gimp yarn 18b of each securing element 18 at the predetermined shaping pressure, and A corresponds to the elongation of the securing element 18 at this shaping pressure.

Just as for the first criterion, the elongation A depends on the method of fixing of the securing element 18.

In the case of a fixing by simple locking, the elongation A of the securing element 18 is equal to the sum of the conformation height h, of the thickness $e_1$ of the first structure 10, of the thickness $e_2$ of the second structure 12 and of the lock length E defined above:

$$A = h/(E + e_1 + e_2)$$

In the case of a fixing by anchoring, the elongation A of the securing element 18 is equal to the sum of the conformation height h, of the thickness $e_1$ of the first structure 10 and of the thickness $e_2$ of the second structure 12:

$$A = h/(e_1 + e_2)$$

The third constraint (iii) is to be sufficiently rigid so as not to break during the steps of handling the assembly and thus to guarantee the correct positioning of the first structure 10 with respect to the second structure 12.

This constraint necessarily means that the core 18a must break at an elongation $A_{rupture\_core}$ less than that corresponding to the state in which the bearing cord elements 17 are taut. Thus, in the case of a fixing by simple locking, in order to allow the rupture of the core 18a, the following applies:

$$A_{rupture\_core} < h/(E + e_1 + e_2).$$

In the case of a fixing by anchoring, in order to allow the rupture of the core 18a, the following applies $$A_{rupture\_core} < h/(e_1 + e_2).$$

It will also be understood that this securing is directly linked to the secant rigidity of the securing element 18 with small deformations, and more particularly to the secant rigidity of its core 18a which ensures the securing of the first structure 10 with respect to the second structure 12 during the handling steps. In practice, one objective is, when the assembly 1 is wound around a drum for its storage and its handling, for the first structure 10 and the second structure 12, which undergo a winding tension T, to not be offset by a distance greater than a maximum distance d. This maximum distance d is typically of the order of one to five millimetres. It follows therefrom that the secant rigidity of the securing element must be greater than or equal to the ratio $E_{min}$ of the force $F_{T\_reinforcement}$ seen by the securing element 18 under this winding tension T and of the elongation $A_T$ that the securing element 18 must be capable of undergoing under this same winding tension T:

$$F_{min} = F_{T\_reinforcement}/A_T$$

with: $F_{T\_reinforcement} = T/N$ in which N corresponds to the average, over a length of one metre of the assembly 1, of the number of securing elements 18 (core 18a+gimp yarn 18b) present over the width I of the fabric.

Just as for the first criterion, the elongation $A_T$ of the securing element 18 under the winding tension T depends on its method of fixing.

In the case of a fixing by simple locking, the securing element must be capable of undergoing an elongation $A_T$ without breaking defined as follows:

$$A_T = \frac{\sqrt{(e_1 + e_2)^2 + d^2} - (e_1 + e_2)}{(e_1 + e_2) + E}$$

In the case of a fixing by anchoring, the elongation $A_T$ is defined as follows:

$$A_T = \frac{\sqrt{(e_1 + e_2)^2 + d^2} - (e_1 + e_2)}{(e_1 + e_2)}$$

As a nonlimiting example, for an assembly comprising ten securing elements 18 comprising a core 18a made of 2×200 tex rayon and a gimp yarn 18b made of 1280 tex elastane every five centimetres in the weft direction, the rupture force $F_{rupture\_core}$ of the core 18a is equal to 6 N (which is compatible with a tensile force $F_{T\_reinforcement}$ applied to the securing element 18 upon the application of the inflation pressure of 10 N). Moreover, for a winding tension T equal to 60 kg and a maximum distance d equal to five millimetres, a minimum secant rigidity $E_{min}$ is obtained that is equal to 4 mN/% in the first case and equal to 940 m NM in the second case.

FIG. 2 summarizes the conditions that the core 18a and the gimp yarn 18b of the securing element 18 have to observe in order to satisfy the three conditions detailed above as well the criterion concerning the rupture force $F_{rupture\_core}$ of the core 18a. More particularly, the shaded zone represents all of the elongations and secant rigidities that comply with these criteria. As is illustrated in this figure, the securing element 18 is preferably dimensioned so that:
 the elongation at rupture of its core 18a, here 2%, is greater than $A_T$,
 the elongation at rupture of its gimp yarn 18b, here 500%, is greater than $A_1$ or $A_2$, depending on its method of fixing
 the secant rigidity of its gimp yarn 18b is less than $E_{max}$
 the secant rigidity of its core 18a is greater than $E_{min}$.

The securing element 18 can comprise at least one of the following elements: a textile thread or a thread made of composite material. The constituent material of the securing element 18 is chosen so as to withstand the bonding temperatures. Preferably, the securing element 18 therefore has a melting point greater than 200° C., and preferably greater than 230° C.

For example, the core 18a and the gimp yarn 18b can each comprise, independently of one another, at least one multifilament strand comprising several monofilaments each composed of a material chosen from among a polyester, a polyamide, a polyketone, a polyurethane, a cellulose, a mineral fibre and an assembly of these materials.

In one embodiment, the gimp yarn 18b can comprise at least one multifilament strand comprising several monofilaments each composed of a material chosen from among a polyester, a polyamide, a polyketone, a polyurethane, a cellulose and an assembly of these materials, preferably chosen from among a polyester, a polyurethane and assemblies of these materials. The cord members made of polyurethane advantageously exhibit elongations at rupture that are relatively high and secant rigidities that are relatively low.

Moreover, the core 18a can comprise at least one multifilament strand comprising several monofilaments each composed of a material chosen from among a polyester, a polyamide, a polyketone, a cellulose, a mineral fibre and assemblies of these materials, preferably chosen from among a cellulose and an assembly of celluloses. The cord members made of cellulose advantageously exhibit elongations at break that are relatively low and secant rigidities that are relative high.

Preferably, the first axis 11 and the second axis 13 are also superposed and/or the first and second transverse edges, of the first structure and of the second structure 12, respectively, are superposed. Superposed will be understood here to mean that the first axis 11 and the second axis 13 (respectively the first and second transverse edges) belong to a determined plane which corresponds to a plane passing through the first axis 11 (respectively the first transverse edge or the second transverse edge) which is at right angles to the surface of the first structure 10 when the first structure 10 is laid flat on a flat surface.

The alignment tolerance of the first axis 11 and of the second axis 13 and the superpositioning tolerance of the edges (longitudinal and/or transverse) is less than or equal to two millimetres, preferably less than or equal to one millimetre.

In one embodiment, both the first axis 11 and the second axis 13 on the one hand and the transverse edges of the first structure 10 and of the second structure 12 on the other hand are superposed, such that the first structure and the second structure 10, 12 are perfectly superposed and aligned (with a tolerance less than or equal to two millimetres, preferably less than or equal to one millimetre). By virtue of the fixing of the securing element 18 onto the first structure 10 and the second structure 12 (and its locking and/or its anchoring with the first cord elements 15 and/or the second cord elements 16), the alignment is assured throughout the handling of the assembly 1 until at least it is first laid on a building drum 5 of a tyre 4, and preferably until it is inflated to the shaping pressure.

The securing element 18 can extend continuously or discontinuously between the transverse edges and/or between the longitudinal edges of the first and second structures 10, 12. As a variant, the securing element 18 could also extend along an axis forming an angle that is neither non-zero nor equal to 90° with the first axis 11.

Continuous will be understood here to mean that the securing element 18 extends over the entire length L (respectively the entire width I) of the first structure 10 (the length L corresponding to the smallest distance between the transverse edges of the first structure 10 when the first structure 10 is flat or, more simply, to the length L of its longitudinal edges when the first structure 10 is parallelepipedal or rectangular, whereas the width I corresponding to the smallest distance between the longitudinal edges of the first structure 10 when the first structure 10 is flat or, more simply, to the width I of its transverse edges when the first structure 10 is parallelepipedal or rectangular).

Discontinuous will be understood here to mean that the securing element 18 extends over only a part of the length L (respectively, of the width I) of the first structure 10, preferably over at least 50% of its length L (respectively, of its width I). In this case, the securing element 18 preferably comprises at least two adjacent segments separated by a determined distance. In order to guarantee that the first structure 10 and the second structure remain perfectly aligned and superposed at all points of the assembly 1, even during the handling of the assembly 1, the distance can notably be at most equal to one metre. In one embodiment, the distance is less than one metre, preferably less than 75 cm. In order to cover at least 50% of the length L of the first structure 10, it will be understood that the number of segments of the securing element 18 increases when their dimension decreases.

The width (dimension in the plane of the first structure 10 and extending in a direction at right angles to the longitudinal edges of the first structure 10) of the securing element 18 can be continuous over the length L (respectively, the width I) of the first structure 10, or variable. A continuous width is however easier to produce industrially and to dimension.

The securing element 18 can extend along and adjacent to one of the longitudinal edges (respectively, transverse edges) of the first structure 10 or, as a variant, at a distance from said longitudinal edge (respectively, from the transverse edge).

Optionally, the outer face (that is to say the face opposite the space 2 formed between the first structure and the second structure 10, 12) of the first structure 10 and of the second structure 12 can be impregnated with an elastomeric composition.

Example of Assembly 1

For an inflation pressure equal to 0.01 MPa, a winding tension equal to 60 kg, a minimum distance d equal to five millimetres, an assembly 1 comprising ten securing elements 18 in the width I for five centimetres and a securing element 18 in the length L for twenty centimetres or N=300, a surface area $S_{tyre}$ equal to 0.3 m$^2$, a thickness of the first structure and of the second structure 10, 20 (e1+e2) equal to 0.8 mm, a conformation height h equal to 40 mm, a lock length E equal to 20 cm:

the minimum elongation $A_1$ (case of a locking of the securing elements 18) is equal to 20% the minimum elongation $A_2$ (case of an anchoring of the securing elements 18) is equal to 5000%, the maximum rigidity $E_{max}$ is equal to 2 m NM (case of a locking of the securing elements 18) or 500 m NM (case of an anchoring of the securing elements 18), the minimum rigidity $E_{min}$ is equal to 4 m NM (case of a locking of the securing elements 18) or 940 m NM (case of an anchoring of the securing elements 18).

In this case, an example of securing element 18 that can be used and that fulfils the three conditions (i), (ii) and (iii) described above is a gimped textile thread comprising a core 18a made of rayon with a dtex count of 2×200 and a gimp yarn made of elastane with a count of 1280 dtex such that the securing element exhibits a density equal to 1.2 g/cm$^3$.

Method for Manufacturing S0 an Assembly 1

An example of manufacturing S0 of such an assembly 1 will now be described.

Figure 3:
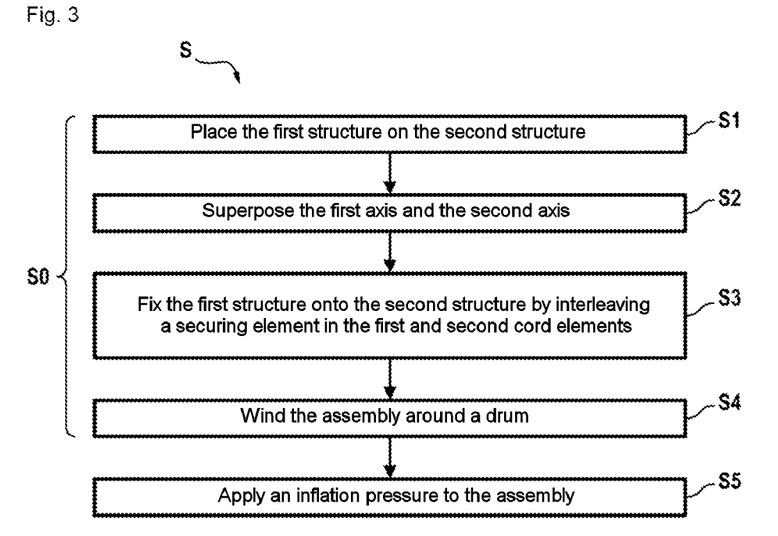
FIG. 3 is a flow diagram illustrating steps of a method for manufacturing an assembly in accordance with an embodiment of the invention.

During a first step S1, an assembly comprising a first structure 10, a second structure 12 and a bearing structure 14 is fetched. This assembly is generally produced previously and in a manner that is known per se and/or can be supplied in roll form, for example from the companies PILE FABRICS GmbH or GIRMES INTERNATIONAL GmbH.

In the case where the assembly is supplied in the form of a roll, the assembly is unwound and laid flat so that one out of the first structure and the second structure 10, 12 is located on a supporting surface. In this position, the first structure and the second structure 10, 12 are therefore stacked on the supporting surface, the bearing cord elements 17 of the bearing structure 14 being already interlaced with the first and second cord elements 15, 16.

During a second step S2, the position of the first structure and of the second structure 10, 12 is adjusted so that the first axis 11 and the second axis 13 become parallel and, if necessary, superposed. Optionally, their position is also adjusted so that their first transverse edges and/or their second transverse edges are superposed.

Preferably, the position of the first structure and of the second structure 10, 12 is adjusted so that the first axis 11 and the second axis 13 are parallel and superposed and their first transverse edge and second transverse edge are superposed. It will of course be understood that the steps S1 and S2 can be performed simultaneously or in succession, in which case these steps S1, S2 can be implemented in a different order without in any way departing from the scope of the invention.

During these steps S1, S2, the first structure and the second structure 10, 12 can be flat over their entire length L, or, as a variant, the assembly can be only partly unwound, the rest of the assembly being unwound progressively during the third step of the method S0.

During a third step S3, the first structure and the second structure 10, 12 are fixed together by at least one securing element 18, by interlacing the securing element 18 with the first and the second cord elements 15, 16 and/or by anchoring it in the first structure and the second structure 10, 12, in order to prevent the movement of the first structure 10 with respect to the second structure 12 during the handling and the use of the assembly 1. When the securing element 18 is fixed onto the first structure 10 or the second structure, its fixing can be done by stitching, by bonding or by ultrasound welding.

The first structure and the second structure 10, 12 can be fixed using a single securing element or, as illustrated in the figures, by several distinct securing elements 18. In this case, the distinct securing elements 18 can extend parallel to one another and/or transversely to one another. Preferably, in order to make the stresses even more uniform in the assembly 1 and to simplify the manufacturing of the assembly 1, the securing elements 18 are separated by a substantially constant pitch from one another.

As a variant, the steps S1 to S3 can be performed directly by the weaver in the weaving machine used for the production of the assembly, in order to guarantee that the first structure and the second structure 10, 12 are perfectly aligned and avoid winding and unwinding operations that are likely to generate alignment difficulties.

Optionally, the outer face of the first structure 10 and the second structure 12 can be impregnated with an elastomeric composition, typically rubber, for example by calendering. This impregnation can be performed after the fixing S3 of the first structure and the second structure 12 with the securing element 18.

If necessary, during a fourth step S4, the assembly 1 can then be handled and notably wound around a cylinder in order for it to be stored before its use. The securing element 18 is then subjected to a winding tension T. This handling is notably facilitated by the secure fixing of the first structure 10 with the second structure 12, which avoids any slippage of one of the structures 10, 12 with respect to the other 12, 10, and by the capacity of the securing element 18 to undergo this winding tension T without being deformed.
Production of a Tyre 4

The assembly 1 that is thus obtained can notably be used in the production of a tyre 4.

For that, the assembly 1 is placed on a building drum 5 in order to produce a tyre 4. If necessary, the assembly 1 can be previously cut.

An annular space 2 delimited radially by an inner face of the first structure 10 and an inner face of the second structure 12 is then formed (see FIG. 1).

During the formation of this space, the securing element 18 is elongated without breaking, thus allowing radial separation of the first structure 10 with respect to the second structure 12. The annular space 2 can, for example, be formed by inflation by applying a predetermined shaping pressure (step S5).

It will be noted in particular that the core 18a of the securing element 18 makes it possible to guarantee the correct positioning of the first structure 10 with respect to the second structure 12 until they are laid on the building drum 5. In fact, since the secant rigidity of the core 18a of the securing element 18 is chosen so as to be greater than $E_{min}$, which is determined as a function of the winding tension T and its method of fixing (by locking or anchoring), it is capable of keeping the first structure 10 aligned with the second structure 12. Furthermore, since the core 18a breaks during the shaping of the tyre 4 and the secant rigidity of the gimp yarn 18b of the securing element 18 is less than $E_{max}$, the securing element 18 does not prevent the deployment of the assembly 1 upon the application of the shaping pressure S5.

The tyre 4 is then manufactured by adding and successively fixing a crown 6 and a tread 7 onto the duly deployed assembly 1. The crown 6 and the tread 7 can be conventional.

Reference can notably be made to the documents WO2017/103490 and WO 2017/103491 described above for more details on means for manufacturing a tyre 4 with such an assembly 1.

The invention claimed is:

1. An assembly for a tire comprising:
a first structure formed by first cord elements, the first structure having a longitudinal edge extending in a first direction which defines a first axis;
a second structure formed by second cord elements, the second structure comprising a longitudinal edge extending in a second direction which defines a second axis, the first axis and the second axis being parallel;
a bearing structure comprising bearing cord elements linking the first cord elements of the first structure and the second cord elements of the second structure; and
at least one cord securing element fixed to each of the first cord elements and to the second cord elements,
wherein the at least one cord securing element comprises a gimped cord element comprising a core around which a gimp yarn is wound,
wherein the core of the at least one cord securing element exhibits an elongation at rupture lower than a ratio between a conformation height h of the assembly and a sum of a thickness of the first structure, of a thickness of the second structure, and of a lock length:

$$A_{rupture\_core} < h/(E+e_1+e_2)$$

in which:
$A_{rupture\_core}$ is the elongation at rupture of the core,
h is the conformation height of the assembly, corresponding to a height between opposite faces of the first structure and of the second structure when the bearing cord elements are taut,
$e_1$ is the thickness of the first structure, $e_2$ is the thickness of the second structure, and
E is the lock length, and
wherein the gimp yarn of the at least one cord securing element exhibits an elongation at rupture greater than an elongation equal to the ratio between the conformation height h of the assembly and the sum of the thickness of the first structure, of the thickness of the second structure, and of the lock length:

$$A_{rupture\_gimp} > h/(E+e_1+e_2)$$

in which:

$A_{rupture\_gimp}$ is the elongation at rupture of the gimp yarn.

2. The assembly of claim 1, wherein the at least one cord securing element exhibits a first secant rigidity and the core exhibits a first elongation at rupture, wherein the gimp yarn exhibits a second secant rigidity and a second elongation at rupture, wherein the first secant rigidity of the securing element is strictly greater than the second secant rigidity of the gimp yarn, and wherein the first elongation at rupture of the core is strictly lower than the second elongation at rupture of the gimp yarn.

3. The assembly of claim 1, wherein the at least one cord securing element has two opposing free ends and is anchored to the first cord elements and to the second cord elements at its free ends and is locked in the first structure and in the second structure between its free ends.

4. The assembly of claim 1, wherein the at least one cord securing element has two opposite free ends and is anchored to the first cord elements and to the second cord elements at the free ends and at a plurality of points between the free ends wherein the elongation at rupture of the core is lower than a ratio $A_2$ between the conformation height h of the assembly and the sum of the thickness of the first structure and of the thickness of the second structure:

$$A_{rupture\_core} < A_2 = h/(e_1+e_2),$$

and wherein the elongation at rupture of the gimp yarn is greater than the ratio $A_2$ between the conformation height h of the assembly and the sum of the thickness of the first structure and of the thickness of the second structure:

$$A_{rupture\_gimp} > A_2 = h/(e_1+e_2).$$

5. The assembly of claim 1, wherein a secant rigidity of the gimp yarn of the at least one cord securing element is lower than or equal to a maximum rigidity which corresponds to a ratio between a force undergone by the gimp yarn of the at least one cord securing element upon application of a predetermined shaping pressure so as to form a space separating the first structure and the second structure from one another, and an elongation of the at least one cord securing element at the predetermined shaping pressure:

$$E_{max} = F_{gimp}/A$$

in which:

$F_{gimp}$ corresponds to the force undergone by the gimp yarn of the at least one cord securing element at the predetermined shaping pressure, and A corresponds to the elongation of the securing element at the shaping pressure.

6. The assembly of claim 1, wherein a secant rigidity of the at least one cord securing element is greater than or equal to a minimum rigidity which corresponds to a ratio of a force undergone by the at least one cord securing element under a predetermined winding tension and of an elongation that the securing element is capable of undergoing under the predetermined winding tension:

$$E_{min} = F_{T\_reinforcement}/A_T$$

in which:

$F_{T\_reinforcement}$ corresponds to the force undergone by the at least one cord securing element under the winding tension T, and $A_T$ corresponds to the elongation that the at least one cord securing element is capable of undergoing under the winding tension.

7. A manufacturing method of the assembly of claim 1 comprising the following steps:

placing the first structure on the second structure so that the first axis and the second axis are substantially parallel; and fixing the first structure onto the second structure by fixing at least one cord securing element to each of the first cord elements and to the second cord elements, wherein the at least one cord securing element comprises the gimped cord element comprising the core around which the gimp yarn is wound, wherein the core of the at least one cord securing element exhibits the elongation at rupture lower than a ratio $A_1$ between the conformation height h of the assembly and the sum of the thickness of the first structure, of the thickness of the second structure, and of the lock length:

$$A_{rupture\_core} < A_1 = h/(E+e_1+e_2)$$

in which:

$A_{rupture\_core}$ is the elongation at rupture of the core, h is the conformation height of the assembly, corresponding to the height between opposite faces of the first structure and of the second structure when the bearing cord elements are taut, $e_1$ is the thickness of the first structure, $e_2$ is the thickness of the second structure, and E is the lock length, and wherein the gimp yarn of the at least one cord securing element exhibits the elongation at rupture greater than an elongation equal to the ratio $A_1$ between the conformation height h of the assembly and the sum of the thickness of the first structure, of the thickness of the second structure, and of the lock length:

$$A_{rupture\_gimp} > A_1 = h/(E+e_1+e_2)$$

in which $A_{rupture\_gimp}$ is the elongation at rupture of the gimp yarn.

8. The manufacturing method of claim 7, wherein the at least one cord securing element exhibits a first secant rigidity and the core exhibits a first elongation at rupture, the gimp yarn exhibits a second secant rigidity and a second elongation at rupture, the first secant rigidity of the securing element being strictly greater than the second secant rigidity of the gimp yarn, and the first elongation at rupture of the core being strictly lower than the second elongation at rupture of the gimp yarn.

9. The manufacturing method of claim 7, wherein the at least one cord securing element has two opposite free ends, the fixing step comprising the substeps of anchoring the at least one cord securing element to the first cord elements and to the second cord elements at the free ends and of locking the at least one cord securing element in the first structure and the second structure between the free ends.

10. The manufacturing method of claim 7, wherein the at least one cord securing element has two opposite free ends, the fixing step being performed by anchoring the at least one cord securing element to the first cord elements and to the second cord elements at the free ends and at a plurality of points between the free ends, the at least one cord securing element being configured so that:

the elongation at rupture of the core is lower than a ratio $A_2$ between the conformation height h of the assembly and the sum of the thickness of the first structure and of the thickness of the second structure:

$$A_{rupture\_core} < A_2 = h/(e_1+e_2),\text{ and}$$

the elongation at rupture of the gimp yarn is greater than the ratio between the conformation height h of the assembly and the sum of the thickness of the first structure and of the thickness of the second structure:

$$A_{rupture\_gimp} > h/(e_1+e_2).$$

11. The manufacturing method of claim 7, wherein the first structure and the second structure are configured to be separated by application of a predetermined shaping pressure so as to form a space separating the first structure and the second structure from one another, and the gimp yarn of the at least one cord securing element is configured so that a secant rigidity of the gimp yarn is lower than or equal to a maximum rigidity which corresponds to a ratio between a force undergone by the gimp yarn of the at least one cord securing element upon the application of the predetermined shaping pressure to form the space and the elongation at rupture of the at least one cord securing element:

$$E_{max} = F_{gimp}/A$$

in which:
  $F_{gimp}$ corresponds to the force undergone by the gimp yarn of the at least one cord securing element at the predetermined shaping pressure, and
  A corresponds to the elongation of the at least one cord securing element at the predetermined shaping pressure.

12. The manufacturing method of claim 7, further comprising a step of winding the assembly around a drum by applying a predetermined winding tension to the assembly, wherein a secant rigidity of the at least one cord securing element is greater than or equal to a minimum rigidity which corresponds to a ratio of a force undergone by the at least one cord securing element under the predetermined winding tension and of an elongation undergone by the at least one cord securing element under the predetermined winding tension:

$$E_{min} = F_{T\_reinforcement}/A_T$$

in which:
  $F_{T\_reinforcement}$ corresponds to the force undergone by the at least one cord securing element under the predetermined winding tension T; and
  $A_T$ corresponds to the elongation undergone by the at least one cord securing element under the predetermined winding tension.

13. The manufacturing method of claim 7, further comprising, prior to the fixing step, a step during which the first axis and the second axis are superposed.

14. A manufacturing method of a tire comprising the following steps:
  supplying the assembly of claim 1; and
  applying a shaping pressure so as to form an annular space delimited by an internal face of the first structure and by an internal face of the second structure, and to break internal face of the first structure and by an internal face of the second structure and break the core without breaking the gimp yarn of the at least one cord securing element.

15. A tire comprising:
  the assembly of claim 1; and
  an annular space delimited by an internal face of the first structure and by an internal face of the second structure,
  wherein the core of the at least one securing element is broken but the gimp yarn of the at least one cord securing element is not broken.

\* \* \* \* \*